No. 761,818. PATENTED JUNE 7, 1904.
J. W. CALEF.
NON-REFILLABLE BOTTLE.
APPLICATION FILED SEPT. 11, 1903.
NO MODEL.
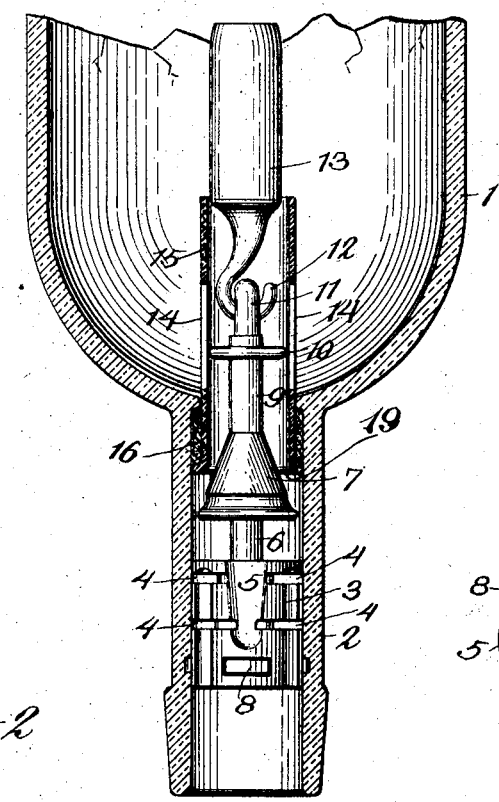
WITNESSES:
INVENTOR
BY
ATTORNEYS No. 761,818. Patented June 7, 1904.

UNITED STATES PATENT OFFICE.

JOSEPH W. CALEF, OF NORTH EASTON, MASSACHUSETTS.

NON-REFILLABLE BOTTLE.

SPECIFICATION forming part of Letters Patent No. 761,818, dated June 7, 1904.

Application filed September 11, 1903. Serial No. 172,713. (No model.)

*To all whom it may concern:*

Be it known that I, JOSEPH W. CALEF, a citizen of the United States, and a resident of North Easton, county of Bristol, and State of Massachusetts, have invented certain new and useful Improvements in Non-Refillable Bottles, of which the following is a specification, taken in connection with the accompanying drawings, which form a part of the same.

This invention relates to non-refillable bottles, and relates especially to the construction of the valve-casing, valve, and attached weight used in such bottles.

In the accompanying drawings, in which the same reference-numerals refer to the same parts of the several figures, Figure 1 is a vertical section of an embodiment of this invention, the bottle being shown in dispensing position. Fig. 2 is a similar view, the valve being indicated as closing the bottle. Fig. 3 is a detail.

In the embodiment of this invention shown in the drawings a bottle 1, of glass or other suitable material, is indicated, having the neck 2 of the usual form. This bottle may of course be of any desired shape and is usually employed in connection with a cork or closing device of any desired form. The valve-casing 15 is formed, preferably, of glass or similar material and is shown as having a substantially cylindrical shape indicated, suitable slots 14 being preferably formed in its sides to allow a flow of liquid therethrough. This casing is provided at its outer end with the valve-seat 19, the casing being firmly secured in position in the neck of the bottle by a packing 16 between the two parts at this point. Suitably-treated paper is preferably used for this purpose to form an impervious packing; but plaster-of-paris or other suitable cement may be employed.

The valve 7, which accurately fits the valve-seat 19, is mounted to properly coact therewith and is preferably formed with the reduced stem 9, upon which the guard 10 may be formed to accurately guide the valve with relation to the casing in its movements. Any desired means may be employed to hold the valve against its seat when the bottle is held in dispensing position, and a counterweight is shown for this purpose in the drawings, the counterweight 13 being preferably given elongated cylindrical form, as indicated, and being detachably connected with the valve-stem, preferably by means of the hook 12, formed on the counterweight which coöperates with the eye 11 on the end of the valve-stem. The counterweight is preferably formed with a conical neck 18, which engages the end of the casing 15, so as to firmly hold the valve against its seat, except when the bottle is held in dispensing position, these parts being so proportioned that the elongated counterweight has a lever action and operates, in connection with the wedge action, against the end of the casing, so as to tightly hold the valve upon its seat. As indicated, the valve is preferably formed with the reduced tip 6 to prevent undue movement away from its seat.

The stopper 3 is permanently secured in the neck 2 of the bottle in any desired way, suitable locks 8 being indicated as mounted in recesses in the stopper and forced outward into engagement with coacting recesses in the inside of the bottle-neck by gravity or by any other means, such as suitable springs 17. The stopper is formed with tortuous flow-passages and further provided with a series of channels 5, extending from either end of the same, as indicated in the drawings, and connected by annular passages 4 to allow the flow of liquid. In this way the stopper allows a flow of liquid from the bottle and yet prevents any tampering with the valve mechanism. The stopper cannot be withdrawn from the bottle-neck to allow fraudulent refilling of the bottle.

The parts of this device may be readily assembled, since after the casing is affixed in position in the bottle-neck the valve-stem and counterweight may be hooked together and inserted in the casing, the counterweight 13 being formed of such size as to readily pass through the casing to allow the assembling of the device in this way. The reduced tip 6 is given a length such as to allow a maximum flow around the valve and to hold the parts in such position that the counterweight can readily close the valve. It will be seen that a slight inclination of the bottle from a vertical position (indicated in Fig. 1) causes such an action of the parts as closes the valve, so that the refilling of the bottle is effectually prevented.

It is of course understood that those familiar with this art may make many changes in the form, proportions, and number of parts, may omit parts of this device, and may employ parts of the same in connection with other devices without departing from the spirit of this invention or losing the advantages of the same. I do not, therefore, desire to be limited to the disclosure which has been made in this case; but

What I claim as new, and what I desire to secure by Letters Patent, is set forth in the appended claims.

1. In non-refillable bottles, a cylindrical slotted casing, a seat formed on the end of said casing, a packing formed of impervious impregnated paper to secure said casing in the neck of a bottle, a stopper having tortuous flow-passages therethrough permanently secured in the neck of the bottle beyond said casing, a conical valve having a reduced tip, a stem, a securing-eye and a guard-collar mounted in said casing to coöperate with said seat and an elongated cylindrical counterweight formed with a hook to engage said eye and having a conical neck to engage the end of said casing to hold said valve against said seat.

2. In non-refillable bottles, a valve-casing to be secured to the neck of a bottle, a stopper having tortuous flow-passages in said neck, a valve having a stem and a guard to guide said valve in its longitudinal movement in said casing, means to limit the longitudinal movement of said valve toward said stopper, a counterweight and means to detachably connect said counterweight to said valve-stem.

3. In non-refillable bottles, a slotted casing to be secured to the neck of a bottle, a stopper having flow-passages in said neck a valve having an elongated stem, and a guard within said casing to guide said valve, means to limit the outward movement of said valve away from its seat and an elongated counterweight detachably connected with said valve-stem to hold said valve against its seat.

4. In non-refillable bottles, a valve-casing to be secured to the neck of a bottle, a valve having an elongated stem and a guard within said casing, and an elongated counterweight having a conical neck loosely attached to said stem, said counterweight engaging the end of said casing to hold said valve against its seat.

5. In non-refillable bottles, a casing having flow-passages therein to be secured to the neck of a bottle, a valve having an elongated stem and a guard within said casing to guide said valve, means to limit the outward movement of said valve away from its seat and a counterweight connected with said valve-stem to hold said valve against its seat.

6. In non-refillable bottles, a casing to be secured in the neck of a bottle, a valve in said casing having a stem provided with an eye and an elongated counterweight of less diameter than said casing formed with a conical neck and a hook to engage said eye.

7. In non-refillable bottles, a valve-casing to be secured in the neck of a bottle, a valve having a guard coöperating with said casing and an elongated counterweight loosely connected with said valve, said counterweight being formed with a conical neck to engage the end of said casing to hold said valve against its seat.

8. In non-refillable bottles, a casing having flow-passages therein to be secured in the neck of a bottle, a valve coöperating with said casing, an elongated counterweight of less diameter than said casing normally projecting from the inner end of said casing and means to detachably and loosely connect said valve and said counterweight.

JOSEPH W. CALEF.

Witnesses:
L. MORTON PACKARD,
JAMES N. CARLSON.